(12) United States Patent
Brenner et al.

(10) Patent No.: US 9,641,639 B2
(45) Date of Patent: May 2, 2017

(54) DYNAMIC CACHING DURING TRAVEL

(71) Applicant: Google Inc., Mountain View, CA (US)

(72) Inventors: Andrew Brenner, Sunnyvale, CA (US); Henry Owen Newton-Dunn, Palo Alto, CA (US); Donald Geoffrey Schuller, San Jose, CA (US); Joe Onorato, Cambridge, MA (US); Lei Zhang, Foster City, CA (US); Zhen Song, Sunnyvale, CA (US)

(73) Assignee: GOOGLE INC., Mountain View, CA (US)

(*) Notice: Subject to any disclaimer, the term of this patent is extended or adjusted under 35 U.S.C. 154(b) by 56 days.

(21) Appl. No.: 14/312,713

(22) Filed: Jun. 24, 2014

(65) Prior Publication Data

US 2015/0373138 A1    Dec. 24, 2015

(51) Int. Cl.
*G06F 15/167* (2006.01)
*H04L 29/08* (2006.01)
*H04W 4/02* (2009.01)

(52) U.S. Cl.
CPC ......... *H04L 67/2842* (2013.01); *H04W 4/027* (2013.01); *H04W 4/028* (2013.01)

(58) Field of Classification Search
None
See application file for complete search history.

(56) References Cited

U.S. PATENT DOCUMENTS

| 2008/0151817 | A1* | 6/2008 | Fitchett | H04W 28/20 370/329 |
| 2009/0061881 | A1* | 3/2009 | Gonsa | H04W 40/36 455/442 |
| 2013/0057638 | A1* | 3/2013 | Tamkivi | H04W 4/027 348/14.02 |
| 2014/0004886 | A1* | 1/2014 | Gillett | H04W 4/027 455/456.6 |
| 2014/0066117 | A1* | 3/2014 | Egner | H04W 4/003 455/513 |
| 2014/0067257 | A1 | 3/2014 | Dave et al. | |
| 2014/0213238 | A1* | 7/2014 | Giraud | G07C 5/008 455/418 |
| 2014/0365126 | A1* | 12/2014 | Vulcano | G01C 21/36 701/533 |

\* cited by examiner

*Primary Examiner* — John B Walsh
(74) *Attorney, Agent, or Firm* — Morris & Kamlay LLP

(57) ABSTRACT

Systems, device and techniques are disclosed for modifying a cache value based on an upcoming reduction in connection. A determination be made that a user device is in a travel mode and intended travel data may be received accordingly. Data throughput information corresponding to the intended travel data may be received. A determination that there is an upcoming reduction in connection may be made based on the data throughput information. A cache value (e.g., amount of data received, provided, or cached) may be modified based on the upcoming reduction in connection.

27 Claims, 5 Drawing Sheets

DYNAMIC CACHING DURING TRAVEL

BACKGROUND

Generally, when a user is traveling at a high rate of speed (e.g., traveling in a car), a user device may experience a loss in signal strength at various portions of the travel. Often, a user may be disconnected due to the loss in signal and may not be able to receive data from a source such as a satellite or cellular tower during these times. As an example, a user may be traveling on a highway, in her car. The user may be streaming music to her car via a satellite connection. A portion of the highway may be next to a mountain area, such that the connection between the satellite and the user's car is broken during that portion of the highway. Accordingly, playback of the streaming music may stop for the duration of the portion of the highway, as the music data is not received by the user's car for that time.

BRIEF SUMMARY

According to implementations of the disclosed subject matter, a determination may be made (e.g., based on a speed, a sensor value, GPS coordinates, cellular data, etc.) that a user device is in a travel mode. Intended travel data may be received based on an intended travel route using, for example, information from a navigation component or historical travel data. Data throughput information corresponding to the travel data may be received and a determination may be made that a reduction in connection is upcoming, based on the data throughput information. Based on the determination of an upcoming reduction in connection, a cache value may be modified.

According to implementations of the disclosed subject matter, a means to determine that a user device is in a travel mode may be provided. Means to receive intended travel data based on an intended travel route may also be provided. Data throughput information corresponding to the travel data may be received and a determination may be made that a reduction in connection is upcoming, based on the data throughput information. Based on the determination of an upcoming reduction in connection, a cache value may be modified.

Systems and techniques according to the present disclosure allow modifying a cache rate based on determining an upcoming reduction in connection speed. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable modifying a cache value based on determining that an upcoming reduction in connection. As disclosed herein, a determination may be made that a user device is in travel mode. A user device may be a mobile device (e.g., mobile phone, tablet, laptop, independent component etc.) or a vehicle component (e.g., a vehicle processor, communication component, radio, etc.). The determination that the user device is in travel mode may be based on a speed associated with the user device exceeding a threshold speed or a connection, a sensor value, GPS coordinates, cellular data, or the like. If a user device is in travel mode, then data throughput information may be received based on the intended travel data. The data throughput information may indicate a connection speed, download speed, or the like for the all or part of a route that a user intends to take or for alternative travel routes based on a start position and a destination position for the user. A travel route may be based on navigation information, heading direction, or the like (e.g., from a car's navigation system, a mobile device's navigation application, based on GPS signals, etc.). Based on the data throughput information, a determination may be made that a reduction in connection is upcoming. Based on the determination, a cache value may be modified such that the amount of data provided, received, or cached may be modified. As an example, a user may be traveling at a speed of 60 mph and based on the speed, a user's vehicle may be determined to be in travel mode. The car's navigation may indicate that the user intends to travel on the current highway for 40 more miles. Data throughput information for the upcoming 40 miles may be received based on, for example, crowd-sourcing the data throughput of drivers who are ahead of the user's car, for the next 40 miles. It may be determined that in 4 miles, there is an upcoming reduction in connectivity such that the user may not be connected to a satellite that is currently providing music to the user's car. Based on this determination, the amount of music data cached by the user's car may be doubled to provide continuous music streaming to the user while the connection is reduced in 4 miles.

As disclosed herein, a user device may be any device configured to receive and/or transmit information to a different device (e.g., to a server, database, cloud component, memory, etc.). A user device may be a mobile device or a vehicle component. A mobile device may be a user's mobile phone, tablet, laptop, or a standalone or packaged component configured to receive and/or transmit information. A vehicle component may be a vehicle processor, a vehicle communication component, a radio, an antenna, or the like.

Figure 1:
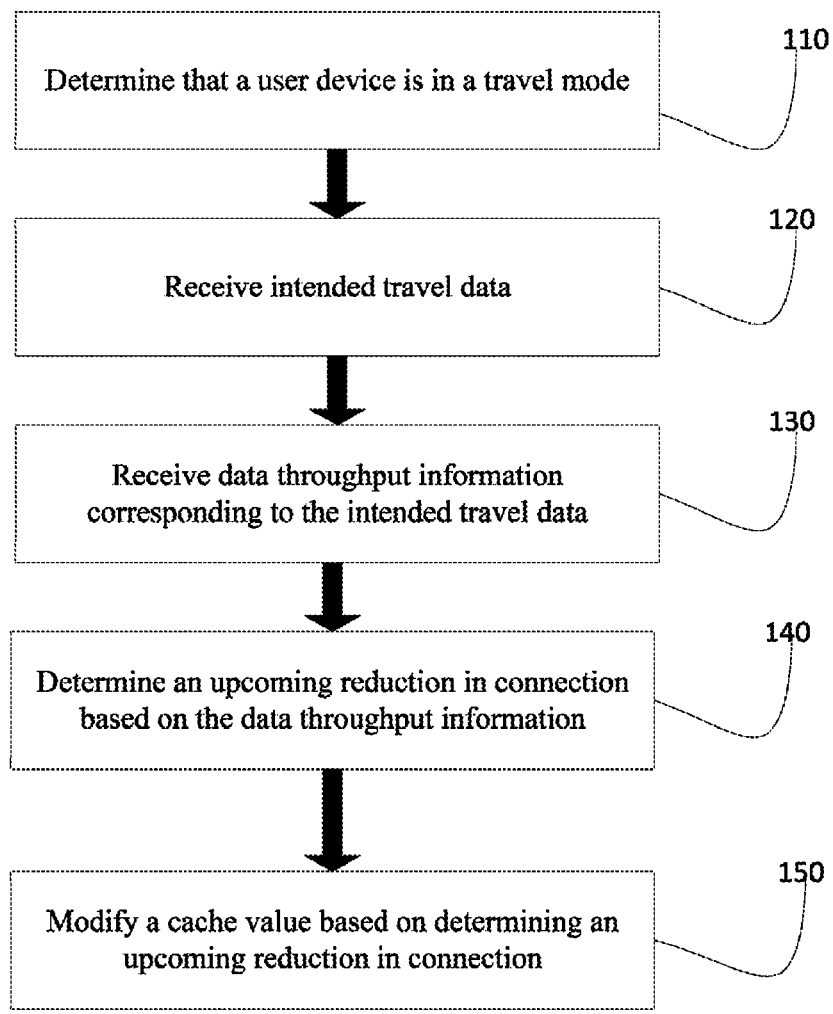
FIG. 1 shows an example process for modifying a cache rate, according to an implementation of the disclosed subject matter.

According to an implementation of the disclosed subject matter, as shown in FIG. 1 at step 110, a determination may be made that a user device is in travel mode. Travel mode may indicate that a user is traveling such that characteristics of a connection between a user device and a transmitting device may change. The characteristics of a connection may include connection speed, connection strength, packet loss rate, or the like. The determination that a user device is in travel mode may be made based on a determination that a user device, or a vehicle containing a mobile device, is moving at a speed higher than a threshold speed. The threshold speed may be predetermined or may be dynamically determined (e.g., dynamically determined based on a type of vehicle). As an example, a threshold speed may be 15 mph. A car's processor may provide an indication that the car is traveling at 45 mph. Accordingly, based on the car's speed (i.e., 45 mph) being higher than the threshold speed (i.e., 45 mph), the car (or a mobile device within the car) may be determined to be in travel mode.

Alternatively or in addition, the determination that a user device is in travel mode may be made based on a connection, a sensor value, GPS coordinates, cellular data, or the like. A connection may be a connection between a mobile device and a vehicle (e.g., a user's mobile phone connected to the user's car via Bluetooth). Sensor values may include, for example, values from an accelerometer, a speedometer, a vehicle computer, or the like. A change in GPS coordinates or cellular triangulation may provide an indication of a device travel speed. Likewise, data may be received from one or more external sensors, such as toll sensors, traffic cameras, radar and the like.

According to an implementation of the disclosed subject matter, as shown at step 120 in FIG. 1, intended travel data may be received based on determining that a user device is in travel mode. The intended travel data may be an indication of the travel route that a user intends to take. The intended travel data may include intended street or highway data, predicted travel speed, expected arrival times (for various points along the travel route), or the like. As an example, intended travel data may indicate that a user will be on a current highway for 14 miles and will reach the 7$^{th}$ mile in 8 minutes.

Intended travel data may be determined based on information received from a user navigation component. A user navigation component may be a user's vehicle navigation component or a user's mobile device navigation component (e.g., a direction application). The intended travel data may include route, destination, speed, time, or the like and may be based on current or historical traffic data. As an example, a user may input a destination into her car's navigation system and the navigation system may generate a route for the user to take. The generated route information may be provided along with expected speed and time information for all or some points along the route.

Intended travel data may be determined based on historical travel data. Historical travel data may be based on previous travel by the user, user device, other user's travel, other user devices, or the like. The historical travel data may be based on a current user's intended destination, on a current road that the user is on, a time, or the like. As an example, historical travel data may correspond to what route and how fast a current user previously traveled to reach a current intended destination. The historical travel data may average a number of previous times that a user traveled an intended route or may select from one or more previous trips based on a best match. The best match may factor in a current time compared to the times of previous travel. As an example, a user may be traveling via a route that the user has previously traveled along four times. The intended travel data applied during a current trip may correspond to the one trip the user made via the same route that was at about the same time of day as the current trip. Here, matching the current trip to a historically stored trip may enable a more accurate representation of traffic patterns, likely speeds, and arrival times.

According to an implementation of the disclosed subject matter, as shown in FIG. 1 at step 130, data throughput information corresponding to intended travel data may be received. Data throughput information may correspond to the amount of data provided to, received by, or cached by a user device. The data throughput information may be based on specific locations along a travel route such as, for example, specific sections of a road. As an example, data throughput information at mile marker 4 of a highway may be 1 megabits per second (mbps) and at mile marker 6 may be 0.4 mbps. As disclosed herein, the data throughput information may correspond to the intended travel data such that the data throughput information may be provided for all or a subset of the portions of the intended travel route. As an example, the data throughput on a highway that a user is currently traveling on may be at a rate of 2 mbps. The navigation system of the user's car may indicate that the user will be turning onto a hilly street in 3 miles. The data throughput information for the hilly street may indicate that the throughput there may only be 0.3 mbps.

The data throughput information may be based on crowd-sourced information. Crowd-sourced information may correspond to information gathered from one or more other users and/or user devices. The crowd-sourced information disclosed herein may be collected form user devices that are traveling along the same or similar intended travel route as a current user. As an example, a current user may be traveling on a highway and the navigation system of the user's car may indicate that the user will be on the highway for another 12 miles. Accordingly, the crowd-sourced information may correspond to throughput information from other vehicles that are ahead of the current user, for the 12 mile stretch. The crowd-sourced information may be provided by the one or more other users on the intended travel route and may be received by an entity configured to communicate with a current user's mobile device. The entity configured to communicate with a current user's mobile device may be a satellite, a server, a cloud component, a database, a computer, or the like. The entity may be configured to receive data throughput information from one or more other user devices and analyze the throughput information to determine connection attributes associated with the information.

Figure 2:
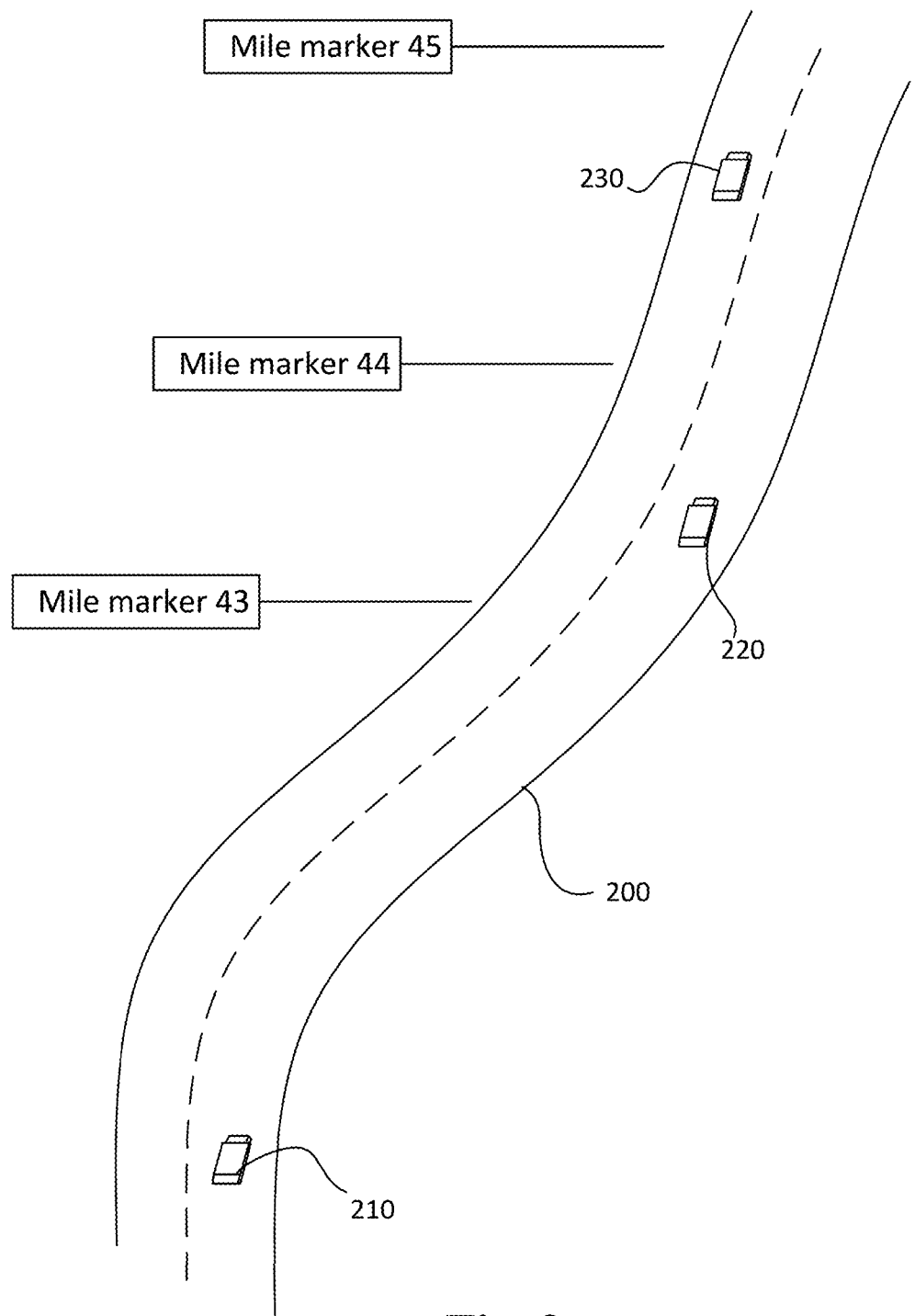
FIG. 2 shows an example intended travel route according to an implementation of the disclosed subject matter.

FIG. 2 shows an illustrative example of data throughput information from crowd-sourcing. A current car 210 may be traveling on a street 200 at a first location. The intended travel data for the car 210 may indicate that the user intends to travel on the street 200 at least till mile marker 45. Based on the intended route (at least till mile marker 45), other user devices 220 and 230 may be crowd-sourced to determine upcoming data throughput information. User device 210 may receive a connection speed of 1.5 mbps from a music satellite at user device 210's current position. The connection speed may be sufficient for continuous streaming such that the user's car may only cache 0.5 mb/s of a currently playing song while maintaining the current speed to maintain the continuous streaming. User device 220 may indicate that, at its current position, between mile marker 43 and 44, the connection speed from the music satellite is 0.3 mbps. User device 230 may indicate that, at its current position, between mile marker 44 and 45, the connection speed from the music satellite is 1.5 mb/s. As disclosed herein, the cache value for user device 210 may be adjusted based on this crowd-sourced information.

The data throughput information may be based on historical information. Historical information may correspond to historical travel data for a current user device or the historical travel data for one or more other user devices. Historical data may include travel data collected in the past for a current user or one or more other users. The travel data may include, travel route speed information, time information, connection information (e.g., connection speed, connection strength, packet loss rate, etc.), or the like. As an example, historical information associated with a user may include information for a specific route taken by the user in the past. The information may also include the connection speed at all or a subset of points along that route. More specifically, a user may have traveled along a street A in the past. During the user's travel along the street A, the user may have had varying connection speeds. A log may have been kept indicating the various connection speeds along the travel route. Data throughput information may also be provided by sensors at or near a given route or location. For example, a sensor along a given route can ping one or more servers or receive pings from servers and send acknowledgment messages. The speed of the data transfer can then be measured. Such throughput measurements can be derived from the behavior of existing sensors (such as traffic cams, speed monitors, toll sensors, etc.) or programmed into them as an additional feature. Further, throughput data can be stored as a profile corresponding to a route, a portion of a route or a location. For example, a profile can include a series of throughputs, each corresponding to a different time of day, time of year, workweek or weekend, etc. A profile can include a statistical confidence measurement, a divergence measurement (e.g., standard deviation) and the like. Such measurements can be associated with the profile as a whole or with one or more individual throughputs.

Figure 3:
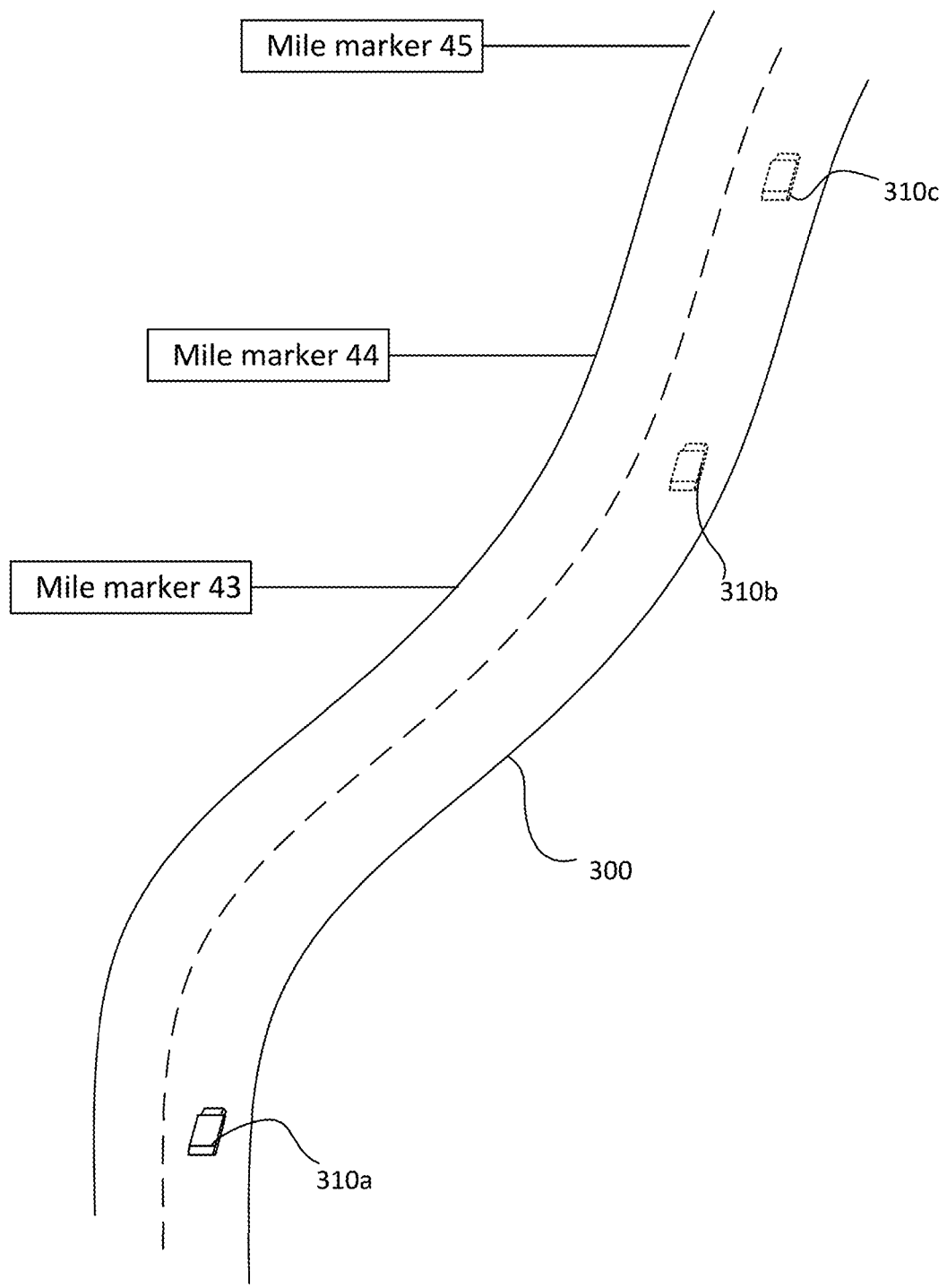
FIG. 3 shows an example according to an implementation of the disclosed subject matter.

FIG. 3 shows an illustrative example of data throughput information from historical data. A current car 310a may be traveling on a street 300 at a first location. The intended travel data for the car 310a may indicate that the user intends to travel on the street 300 at least till mile marker 45. Based on the intended route (at least till mile marker 45), historical data regarding the car 310a represented by 310b and 310c may be accessed. The historical data at points 310b and 310c may correspond to a previous time that the car 310a traveled along the same route. The car 310a may receive a connection speed of 1.5 mbps from a music satellite at car 310a's position. The connection speed may be sufficient for continuous streaming such that the user's car may only cache 0.5 mb/s of a currently playing song while maintaining the current speed to maintain the continuous streaming. Historical data corresponding to the car 310a's previous travel until mile marker 45 may be received for points 310b and 310c. The historical data may indicate that when the car 310a was previously at the point 310b, between mile marker 43 and 44, the connection speed from the music satellite was 0.3 mbps. The historical data may also indicate that when the car 310a was previously at the point 310c, between mile marker 44 and 45, the connection speed from the music satellite was 1.5 mb/s. As disclosed herein, the cache value for user device 310a may be adjusted based on this historical information.

According to an implementation of the disclosed subject matter, as shown at step 140 in FIG. 1, a determination of upcoming reduction in connection may be made. The upcoming reduction may correspond to a likely reduction in connection speed, connection strength, likely packet receive rate, increase in error rate, or the like. Alternatively or in addition, a reduction in connection may be a null connection such that no data is provided, received, or cached during the reduction in connection. The determination of an upcoming reduction in connection may be based on crowd-sourced data or historical data. The determination of an upcoming reduction in connection may be based on determining current connection characteristics of one or more other user devices along the current user device's intended travel route. Alternatively or in addition, the determination of an upcoming reduction in connection may be based on determining previous connection characteristics of the current user device or one or more other user devices that previously traveled along the current user device's intended travel route. For example, the crowd-sourced data from one or more cars ahead of a current car along the same intended travel route as the current car may indicate that that there is a reduction in connection at one or more points long the intended travel route. As another example, historical data associated with a current car or one or more other cars may indicate that certain portions along the route that the current car intends to take have a reduced connection.

According to an implementation of the disclosed subject matter, as shown at step 150 in FIG. 1, a cache value may be modified based on determining an upcoming reduction in connection. A cache value modification may correspond to an increase in the amount of data received per unit of time, an increase amount in data provided per unit of time, a size of a cache and/or an amount of data cached per unit of time. Cache value modification may correspond to either a user device modifying a cache value (e.g., modifying the amount of data received or cached) or by an entity other than the user device modifying a cache value (e.g., providing an amount of data). As an example of modifying the amount of data received, a user device may modify the amount of data that it receives from another entity. As a more specific example, a user device may originally be configured to receive 0.5 mbps. Based on a determination of an upcoming reduction in connection, the user device may be configured to receive 1 mbps. As an example of modifying the amount of data received, a user device may modify the amount of data it caches. As a more specific example, a user device may originally be configured to cache 0.8 mb. Based on a determination of an upcoming reduction in connection, the user device may modify its cache rate to 1.2 mbs. As an example of modifying the amount of data provided by an entity, a satellite may provide data at 0.4 mbps. Based on a determination of an upcoming reduction in connection, the satellite may provide data at 0.8 mbps.

Figure 4:
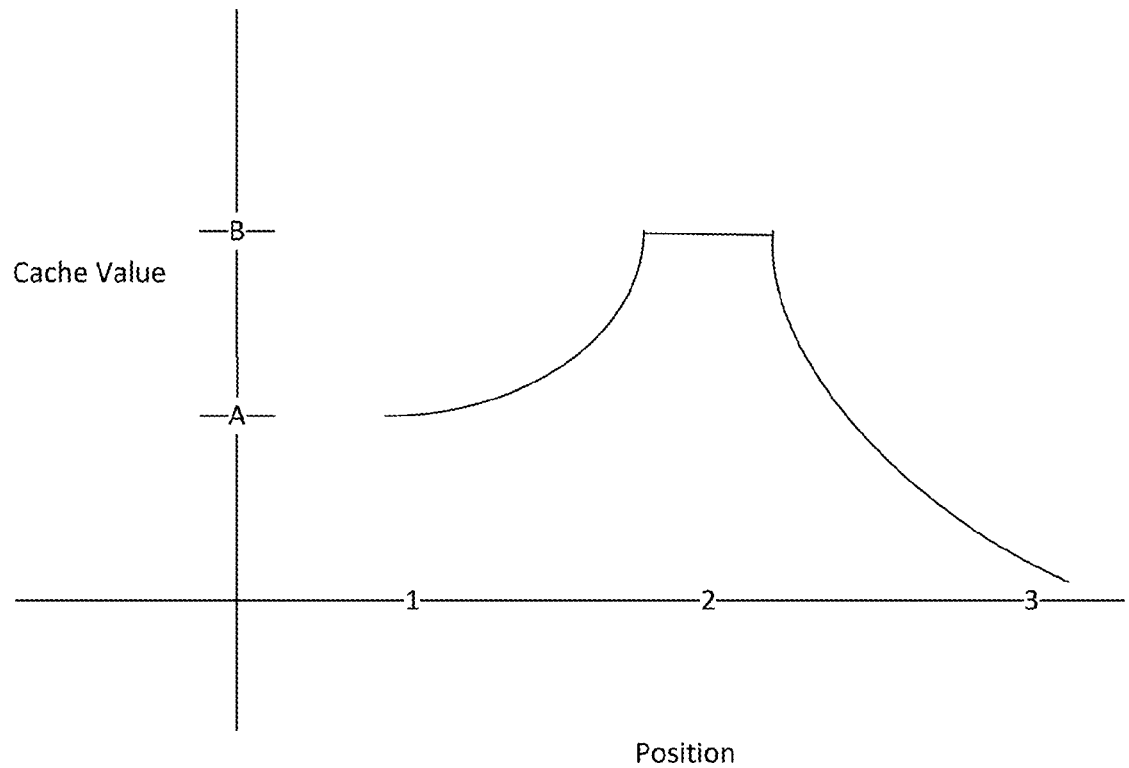
FIG. 4 shows an example cache rate, according to an implementation of the disclosed subject matter.

FIG. 4 shows an example illustration of modifying a cache value. As shown in FIG. 4, at a first position, a user device may cache data at A mbps. A determination of an upcoming reduction in connection may be based on one or more other devices further along the same route as the user device. Based on the upcoming reduction in connection, the data cached by the user device may be increased to B mbps by the time the user device reaches position B. The increase in data cached may enable the user device B to continue streaming data to a user via the user device such that when the user device reaches position 3 and the connection is reduced to a level below level A, the streamed data is provided to the user without a break.

According to an implementation of the disclosed subject matter, a modification in a cache value may be changing the source of data. The source of data may be modified to a Wi-Fi connection, a type of cellular connection, or the like.

As an example, if an upcoming reduction in connection is determined, then a user device may switch from a lower speed cellular connection to a higher speed cellular connection. As a specific example, the higher speed cellular connection may be more costly than an original lower speed cellular connection. Accordingly, the higher speed cellular connection may only be used when a reduction in connection is predicted.

Figure 5:
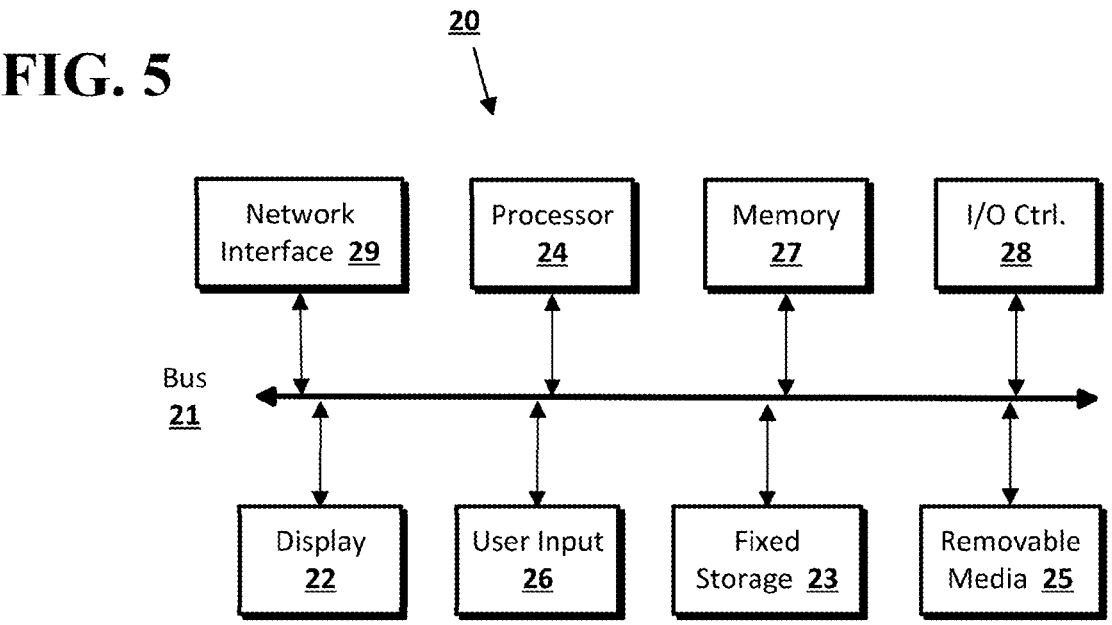
FIG. 5 shows a computer according to an implementation of the disclosed subject matter.

Implementations of the presently disclosed subject matter may be implemented in and used with a variety of component and network architectures. As an example, a mobile phone may be in connection with a cloud server and the cloud server may provide information to an event listener. FIG. 5 is an example computer 20 suitable for implementing implementations of the presently disclosed subject matter. The computer (e.g., mobile phone, tablet, laptop, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
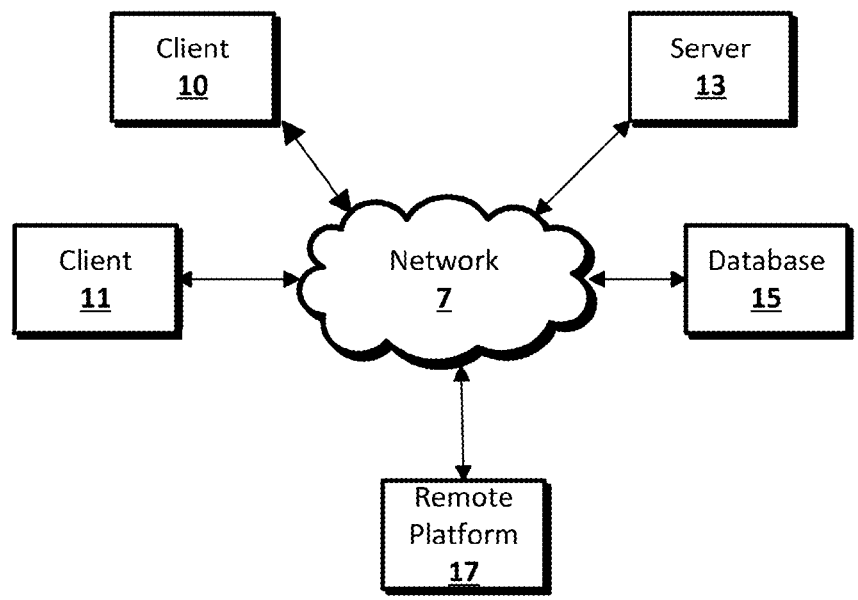
FIG. 6 shows a network configuration according to an implementation of the disclosed subject matter.

FIG. 6 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   determining that a user device is in a travel mode based on the user device moving at a speed higher than a threshold speed;
   in response to the determination that the user device is in the travel mode, receiving, by the user device from a navigation component of a user vehicle, intended travel data comprising a current location of the user vehicle, a current time, a current destination of the user vehicle, and a current road between the current location and the destination;
   comparing the intended travel data to historical travel data comprising a historical location of a particular vehicle, a historical time, a historical road, and historical data throughput information for an entertainment application executing on a particular device;
   determining, based on the comparison of the intended travel data to the historical travel data and based on current throughput information for the entertainment application executing on the user device, that there is an upcoming reduction in connection; and
   modifying a cache value based on determining an upcoming reduction in connection.

2. The method of claim 1, wherein the user device is one selected from the group consisting of: a mobile device and a vehicle component.

3. The method of claim 1, wherein determining that the user device is in the travel mode is based on a vehicle comprising the user device moving at a speed higher than a threshold speed.

4. The method of claim 1, wherein the determination that the user device is in the travel mode is made based on one or more selected from the group consisting of: a connection, a sensor value, GPS coordinates, and cellular data.

5. The method of claim 1, wherein the intended travel data is determined based on an intended travel route.

6. The method of claim 1, wherein the intended travel data is determined based on one selected from the group consisting of: a user navigation component and historical travel data.

7. The method of claim 1, wherein the historical travel data is based on crowd-sourced information.

8. The method of claim 1, wherein the upcoming reduction in connection is determined based on a reduction in throughput experienced by the user device in the past.

9. The method of claim 1, wherein the upcoming reduction corresponds to one selected from the group consisting of: a slower data throughput and a null data throughput.

10. The method of claim 1, wherein modifying a cache value corresponds to increasing the amount of data received per unit of time.

11. The method of claim 1, wherein modifying a cache value corresponds to increasing the amount of data provided per unit of time.

12. The method of claim 1, wherein modifying a cache value corresponds to increasing the amount of data cached per unit of time.

13. The method of claim 1, wherein modifying a cache value corresponds to modifying a source of data.

14. The method of claim 1, wherein:
    the historical data throughput information comprises a quantity of data per quantity of time received by the particular device located within the particular vehicle having a position on the road ahead of the user vehicle.

15. The method of claim 1, wherein:
    the historical data throughput information comprises a quantity of data per quantity of time received by the particular device located within the particular vehicle having a position on the road ahead of the user vehicle; and
    determining the upcoming reduction in connection based on the current data throughput information comprises comparing a quantity of data per quantity of time received by the user device to the quantity of data per quantity of time received by the particular device,
    wherein the quantity of data per quantity of time received by the user device is greater than the quantity of data per quantity of time received by the particular device, and
    wherein the particular vehicle is distinct from the user vehicle and the particular device is distinct from the user device.

16. The method of claim 1, wherein the user vehicle and the particular vehicle are the same vehicle and the user device and the particular device are the same device.

17. A system comprising:
    a processor configured to:
        determine that a user device is in a travel mode based on the user device moving at a speed higher than a threshold speed;
        in response to the determined travel mode, receive, by the user device from a navigation component of a user vehicle, intended travel data comprising a current location of the user vehicle, a current destination of the user vehicle, a current time, and a current road between the current location and the destination;
        compare the intended travel data to historical travel data comprising a historical location of a particular vehicle, a historical time, a historical road, and historical data throughput information for an entertainment application executing on a particular device;

determine, based on the comparison of the intended travel data to the historical travel data and based on current throughput information for the entertainment application executing on the user device, that there is an upcoming reduction in connection; and modify a cache value based on determining an upcoming reduction in connection.

18. The system of claim 17, wherein the user device is one selected from the group consisting of: a mobile device and a vehicle component.

19. The system of claim 17, wherein determining that the user device is in the travel mode is based on a vehicle comprising the user device moving at a speed higher than a threshold speed.

20. The system of claim 17, wherein the determination that the user device is in the travel mode is made based on one or more selected from the group consisting of: a connection, a sensor value, GPS coordinates, and cellular data.

21. The system of claim 17, wherein the intended travel data is determined based on an intended travel route.

22. The system of claim 17, wherein the intended travel data is determined based on one selected from the group consisting of: a user navigation component and historical travel data.

23. The system of claim 17, wherein the historical travel data is based on crowd-sourced information.

24. The system of claim 17, wherein the upcoming reduction in connection is determined based on a reduction in throughput of one or more devices associated with vehicles traveling on an intended travel path associated with the intended travel data.

25. The system of claim 17, wherein the upcoming reduction in connection is determined based on a reduction in throughput experienced by the user device in the past.

26. The system of claim 17, wherein the upcoming reduction corresponds to a one selected from the group consisting of: a slower data throughput and a null data throughput.

27. The system of claim 17, wherein modifying a cache value corresponds to one selected from the group consisting of: increasing the amount of data received per unit of time, increasing the amount of data provided per unit of time, increasing the amount of data cached per unit of time, and modifying source of data.

* * * * *